(12) United States Patent
Kakarala

(10) Patent No.: US 7,015,961 B2
(45) Date of Patent: Mar. 21, 2006

(54) DIGITAL IMAGE SYSTEM AND METHOD FOR COMBINING DEMOSAICING AND BAD PIXEL CORRECTION

(76) Inventor: Ramakrishna Kakarala, 1055 E. Evelyn Ave. #B-9, Sunnyvale, CA (US) 94086

( * ) Notice: Subject to any disclaimer, the term of this patent is extended or adjusted under 35 U.S.C. 154(b) by 739 days.

(21) Appl. No.: 10/222,150

(22) Filed: Aug. 16, 2002

(65) Prior Publication Data
US 2004/0032516 A1 Feb. 19, 2004

(51) Int. Cl.
  H04N 9/64 (2006.01)
  H04N 5/335 (2006.01)
  H04N 5/228 (2006.01)
  G06K 9/32 (2006.01)

(52) U.S. Cl. ............. 348/246; 348/273; 348/222.1; 382/300

(58) Field of Classification Search ............. 348/246
  See application file for complete search history.

(56) References Cited

U.S. PATENT DOCUMENTS

| | | | |
|---|---|---|---|
| 4,833,723 A | 5/1989 | Loveridge et al. | |
| 5,327,246 A * | 7/1994 | Suzuki | 348/246 |
| 5,652,621 A | 7/1997 | Adams, Jr. et al. | 348/272 |
| 6,642,960 B1 * | 11/2003 | Kohashi et al. | 348/247 |
| 6,724,945 B1 * | 4/2004 | Yen et al. | 382/300 |
| 6,806,902 B1 * | 10/2004 | Donovan | 348/246 |
| 2001/0052938 A1 * | 12/2001 | Itoh | 348/273 |
| 2002/0196354 A1 * | 12/2002 | Chang et al. | 348/246 |

FOREIGN PATENT DOCUMENTS

| EP | 1 003 332 | 5/2000 |
|---|---|---|
| JP | 2002-027324 | * 1/2002 |

OTHER PUBLICATIONS

Nicos Herodotou and Anastasios N. Venetsanopoulos; *Colour Image Interpolation for High Resolution Acquisition and Display Devices*; IEEE Transactions on Consumer Electronics, vol. 41, No. 4, Nov. 1995; pp. 1118-1126.

Bo Tao, Ingeborg Tastl, Ted Cooper, Mike Blasgen and Eric Edwards; *Demosaicing using Human Visual Properties and Wavelet Interpolation Filtering*; Proceedings of the IS&T/SID Seventh Color Imaging Conference: Color Science, Systems, and Applications, Scottsdale, Arizona, 1999; pp. 252-256.

Guy Meynants and Bart Dierickx; *A Circuit for the Correction of Pixel Defects in Image Sensors*; Proceedings of the $24^{th}$ European Solid-State Circuits Conference, Sep. 22-24, 1998, The Hague, Netherlands; pp. 312-315.

Yap-Peng Tan and Tinku Acharyz; *A Robust Sequential Approach for the Detection of Defective Pixels in an Image Sensor*; Proceedings of the 1999 International Conference on Acoustics, Speech, and Signal Processing, Phoenix, Arizona, Mar. 15-19, 1999; pp. 2239-2242.

(Continued)

Primary Examiner—David L. Ometz
Assistant Examiner—Nhan Tran

(57) ABSTRACT

A digital image system and method for combining bad pixel correction and demosaicing in a single process is provided by interpolating sensor values for pixels immediately spatially adjacent to the current pixel being examined to detect defective pixels, and using the interpolated values for demosaicing. If the sensor value of the current pixel being examined is outside of a range of sensor values determined from the interpolated values by more than a configurable threshold amount, the current pixel is considered defective, and replaced using an estimated value from the neighboring pixels. The interpolated values calculated for use in detecting bad pixels can further be used as the interpolated values for demosaicing purposes

26 Claims, 7 Drawing Sheets

OTHER PUBLICATIONS

European Search Report dated Feb. 25, 2005.
Patent Abstracts of Japan—vol. 2002, No. 05, May 3, 2002 & JP 2002 027324, Victor Co. Of Japan Ltd.; Jan. 25, 2002.
Bart Dierickx and Guy Meynants—"Missing Pixel Correction Algorithm For Image Sensors"; Proceedings Of The SPIE—The International Society For Optical Engineering SPIE—Int. Soc. Opt. ENG USA, vol. 3410, May 19, 1998, pp. 200-203.
Takashi Komatsu and Takahiro Saito—"A High-Resolution Image Acquisition Method With Defect-Pixel Recovery For Solid-State Image Sensors"; Proceedings 2001 International Conference On Image Processing; ICIP 2001, Thessaloniki, Greece, Oct. 7-10, 2001, International Conference On Image Processing, New York, NY; IEEE, US, vol. 1 of 3, Conf. 8, Oct. 7, 2001, pp. 1053-1056.

* cited by examiner

DIGITAL IMAGE SYSTEM AND METHOD FOR COMBINING DEMOSAICING AND BAD PIXEL CORRECTION

BACKGROUND OF THE INVENTION

1. Technical Field of the Invention

The present invention relates generally to digital color image sensors, and specifically to image processing of sensor values.

2. Description of Related Art

Electronic image sensors are predominately of two types: CCDs (Charge Coupled Devices) and CMOS—APS (Complimentary Metal Oxide Semiconductor—Active Pixel Sensors). Both types of sensors typically contain an array of photo-detectors, arranged in a pattern, that sample color within an image. Each photo-detector corresponds to a pixel of an image and measures the intensity of light of the pixel within one or more ranges of wavelengths, corresponding to one or more perceived colors.

In addition, both types of sensors may include a color filter array (CFA), such as the CFA described in U.S. Pat. No. 3,971,065 to Bayer (hereinafter referred to as Bayer), which is hereby incorporated by reference. With the Bayer CFA, each pixel sees only one wavelength range, corresponding to the perceived color red, green or blue. To obtain the sensor values for all three primary colors at a single pixel location, it is necessary to interpolate the color sensor values from adjacent pixels. This process of interpolation is called demosaicing. There are a number of demosaicing methods known in the art today. By way of example, but not limitation, various demosaicing methods have included pixel replication, bilinear interpolation and median interpolation.

In order for the demosaicing process to produce a visually pleasing image, all of the sensor values produced by the digital image sensor must be accurate. However, despite advances in the manufacturing process, digital image sensors often contain a few defective pixels as a result of fabrication errors, such as impurity contamination. Defective pixels respond inappropriately to the incident light, and therefore produce inaccurate sensor values. A defective pixel can usually be identified by examining the difference between sensor responses of the defective pixel and its immediate pixel neighbors to the same illumination. Once identified, the sensor value of a defective pixel can be replaced with an estimated sensor value from pixels in the neighborhood of the defective pixel.

The process of detecting and correcting defective pixels is referred to as bad pixel correction (BPC). There are a number of algorithms for BPC available in the market today. For example, one BPC method for color image sensors proposed by Maynants & Diercickx in "A circuit for the correction of pixel defects in image sensor", Proceedings of the 24$^{th}$ European Solid-State Circuits Conference, The Hague, Netherlands, Sep. 22–24, 1998, p. 312–315, which is hereby incorporated by reference, detects bad pixels by comparing the sensor value of a current pixel to sensor value predictions from neighboring pixels of the same color on the same row. However, the Maynants & Diercickx BPC method does not compare sensor values that are spatially adjacent to the current pixel, and therefore has the drawback of erasing local ridges in the image, where sensor values peak or recess. In addition, the Maynants & Diercickx BPC method does not compare sensor values vertically, and therefore has the additional drawback of erasing fine vertical lines.

Another BPC method for color image sensors proposed by Tan & Acharya in "A robust sequential approach for the detection of defective pixels in an image sensor" Proceedings of the 1999 International Conference on Acoustics, Speech and Signal Processing, Phoenix, Ariz., Mar. 15–19, 1999, p. 2239–2242, which is hereby incorporated by reference, builds a bad pixel map by accumulating the result of bad pixel detection over a sequence of images based on a minimum difference between a given pixel and its immediate neighbors of the same color However, the Tan & Acharya method requires the storage of the bad pixel map in non-volatile memory. Incorporating non-volatile memory into an image sensor or an image processor chip is a significant expense. Furthermore, the Tan & Acharya method also does not compare spatially adjacent sensor values when creating the bad pixel map.

Therefore, what is needed is a bad pixel correction algorithm that effectively and accurately detects and corrects defective pixels using spatially adjacent sensor values to identify defective pixels near edges and in regions of texture. Furthermore, bad pixel correction (BPC) and demosaicing have traditionally been performed in two separate stages, either in software or in a digital circuit implemented in hardware. Each stage adds to the expense and complexity of processing sensor values for final output on a display device. Therefore, what is further needed is a method that combines an accurate BPC algorithm with demosaicing in a single stage.

SUMMARY OF THE INVENTION

Embodiments of the present invention provide a digital image system and method for detecting and correcting defective pixels by interpolating sensor values of pixels adjacent to a current pixel being examined and comparing the interpolated sensor values to the sensor value of the current pixel to determine whether the current pixel is defective. Further embodiments of the present invention enable the combination of bad pixel correction and demosaicing in a single stage by using the interpolated values determined for detection of defective pixels for demosaicing In one embodiment, the bad pixel correction algorithm detects defective pixels using interpolated values in the same color plane as the current pixel being examined for the pixels immediately spatially adjacent to the current pixel The interpolated values are calculated using a median interpolation technique to ensure that any defective sensor values remain isolated. If the sensor value of the current pixel being examined is above the maximum of the sensor values (actual and/or interpolated) of the immediately spatially adjacent neighbors or below the minimum of the sensor values of the immediately spatially adjacent neighbors by more than a configurable threshold amount, the current pixel is determined to be defective. For each defective pixel detected, the sensor value of the defective pixel is replaced using an estimated sensor value calculated from the actual sensor values of neighboring pixels in the same color plane and/or the interpolated values of immediately spatially adjacent neighboring pixels.

In further embodiments, the previously interpolated values used for the detection of defective pixels can be applied during demosaicing. Thus, once the interpolated values are calculated for bad pixel correction (BPC), these interpolated values can be used as the interpolated values for demosaicing purposes.

Hence, by using the interpolated values for both BPC and demosaicing, the two processes (BPC and demosaicing) can be performed in a single stage. In addition, using interpolated values during BPC provides the additional advantage of identifying defective pixels near edges and in regions of texture, since both vertical and horizontal pixel neighbors nearest to the pixel being examined are used in the calculation of the interpolated values. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
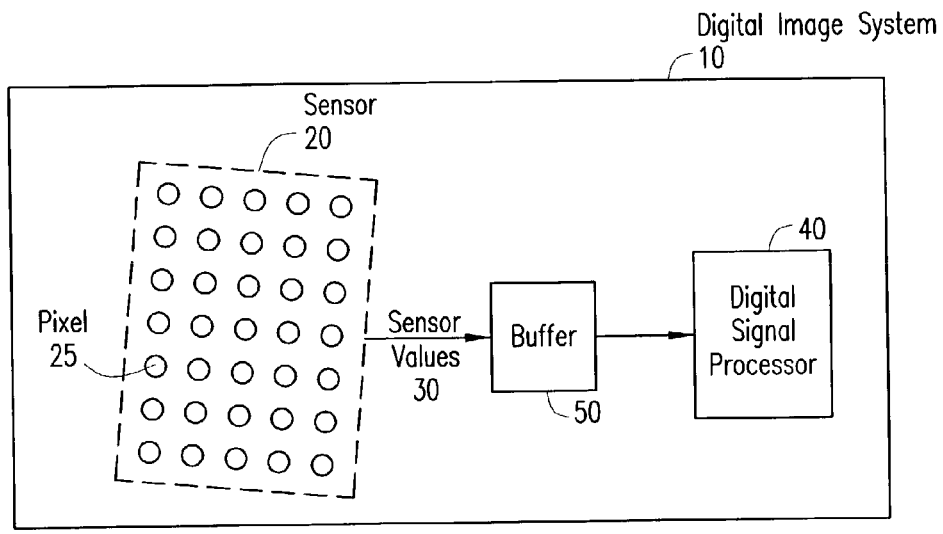
FIG. 1 is a is a block diagram illustrating a digital image system utilizing a bad pixel correction (BPC) and demosaicing algorithm in accordance with exemplary embodiments of the present invention.

FIG. 1 shows a digital image system 10 implementing a bad pixel correction (BPC) algorithm, that can be combined with a demosaicing algorithm, in accordance with the present invention The digital image system 10 can be any digital imaging device, such as a digital camera, video camera, medical imaging device, etc. The digital image system 10 can also be a computer system, such as a personal computer or server, having a memory therein for storing image data. Thus, the algorithm can be within a digital imaging device or a part of an image processing software running on a personal computer or server.

The digital image system 10 may include a digital image sensor 20, such as a CMOS sensor chip or a CCD sensor chip, which includes a two-dimensional array of pixels 25 arranged in rows and columns. It should be understood that if the digital image system 10 is a computer system, the digital image sensor 20 is not included within the digital image system, but rather provides sensor values to the digital image system 10. The digital image sensor 20 may be covered by a color filter array (CFA), such that each pixel 25 senses only one color. For example, the CFA can be the popular Bayer CFA, in which chrominance colors (red and blue) are interspersed amongst a checkerboard pattern of luminance colors (green). The following is an example of the Bayer CFA:

| R | G | R | G | R |
| G | B | G | B | G |
| R | G | R | G | R |
| G | B | G | B | G |
| R | G | R | G | R |

It should be understood that other CFAs may be used instead of the Bayer CFA described herein. It should also be understood that other color spaces, such as yellow, cyan and magenta, can be used instead of the red, blue and green color space discussed herein.

The digital image sensor 20 provides raw sensor values 30 containing the original red, blue and green pixel values to a digital signal processor 40, which applies the BPC (and demosaicing) algorithm of the present invention to the sensor values 30 in order to detect and correct defective pixels and interpolate sensor values to produce a complete image. The sensor values 30 are provided to the digital signal processor 40 blocks at a time. Thus, the sensor values 30 are stored in a buffer 50 until the requisite number of sensor values 30 is present to begin processing.

The number of sensor values 30 needed to begin processing depends on the type of processing. For example, the sensor values 30 are typically read off the sensor 20 one row at a time. In one embodiment, for the process of detecting and correcting defective pixels and demosaicing the sensor values to begin, at least five rows of sensor values 30 are stored within the buffer 50. The rows include the current row including the sensor value of the current pixel being examined and the two rows directly above and directly below the current row to interpolate sensor values for immediately spatially adjacent neighbors to the current pixel. It should be understood that the immediately spatially adjacent neighbors are those pixels that are directly adjacent to a particular pixel, such that no other pixels are in between the particular pixel and one of the immediately spatially adjacent neighboring pixels. In addition, since most digital cameras take multiple images to ensure the exposure is correct before selecting the image to permanently store, one or more images may be stored in the buffer 50 at a time.

Once demosaiced, the interpolated (demosaiced) color planes can be used in subsequent processing (not shown). For example, the interpolated color planes can be compressed using a compression method (not shown), such as the JPEG standard, prior to being output to an output device (not shown), such as a video screen, computer screen or printer.

Figure 2:
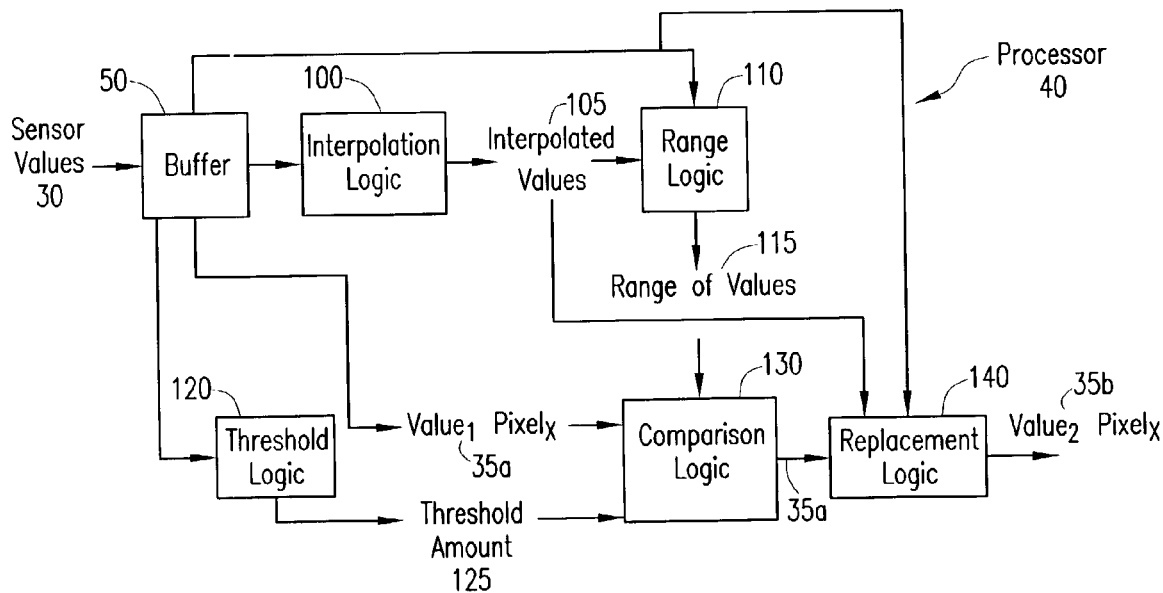
FIG. 2 is a logic flow diagram illustrating exemplary logic for implementing the BPC algorithm in accordance with exemplary embodiments of the present invention.

Referring now to FIG. 2, the digital signal processor 40 detects and corrects defective pixels 25 for sensor values in each image stored in the buffer 50 according to logic associated with the BPC algorithm. The BPC processor 40 takes as input the raw sensor values 30 provided by the buffer 50. The raw sensor values 30 include the sensor value 35 of the current pixel (Value$_1$ Pixel$_x$) and sensor values 30 of neighboring pixels in the current row of the current pixel and/or the row(s) directly above or directly below the current row. Interpolation logic 100 within the BPC processor 40 calculates interpolated sensor values 105 for the immediately spatially adjacent neighboring pixels to the current pixel from the raw sensor values 30 of neighboring pixels surrounding the current pixel in the same color plane as the current pixel. It should be understood that as used herein, the term "logic" refers to the hardware, software and/or firmware for performing the stated function. Interpolation logic 100 uses a median interpolation technique to ensure that any defective sensor values remain isolated.

For example, assume the following raw sensor values 30 are supplied to the interpolation logic 100:

| $B_1$ | $G_1$ | $B_2$ |
|---|---|---|
| $G_2$ | $R_1$ | $G_3$ |
| $B_3$ | $G_4$ | $B_4$ |

To interpolate the green value at the red pixel location ($R_1$) using median interpolation, the maximum and the minimum sensor values among $G_1$, $G_2$, $G_3$ and $G_4$ are filtered out and the average of the remaining two sensor values is used as the interpolated green value for the red pixel location ($R_1$). Likewise, to interpolate the blue value at the red pixel location ($R_1$) using median interpolation, the maximum and minimum sensor values among $B_1$, $B_2$, $B_3$ and $B_4$ are filtered out and the average of the remaining two sensor values is used as the interpolated blue value for the red pixel location ($R_1$). By taking the average of only the two middle values, any defective sensor values can be filtered out to avoid skewing the interpolated values used for bad pixel detection, and ultimately, demosaicing of the image.

Turning again to FIG. 2, the interpolated values 105, and in some embodiments, the raw sensor values 30 (as discussed below in connection with FIGS. 4–7), are provided to range logic 110 to determine a range of sensor values 115 in the same color plane as the current pixel from the immediately spatially adjacent neighboring pixels. For example, in one embodiment, the range of sensor values 115 can include a maximum sensor value and minimum sensor value from the interpolated values for the immediately spatially adjacent pixels.

The raw sensor values 30 can further be provided to threshold logic 120 to compute a threshold amount 125. In one embodiment, the threshold amount 125 can be variable depending on the light conditions of the image. In low light conditions, the sensor values are low and the signal to noise ratio is low, thus requiring a lower threshold amount 125 for determining whether a pixel is defective. By contrast, in normal or bright light conditions, the sensor values are high and the signal to noise ratio is high, thereby enabling a higher threshold amount 125 to be set for determining whether a pixel is defective. In many cameras, the light conditions are measured by the auto exposure system. For example, in low light conditions, the auto exposure opens the shutter for a longer period of time than in normal or bright light conditions. Therefore, the threshold amount 125 can be set based on the auto exposure system of the camera. Additionally, by lowering the threshold amount 125 in low light conditions, the BPC process can further serve to improve noise levels in low light images. Thus, in some embodiments, the threshold amount 125 can be set during the manufacturing process, by an operator of the digital image system or using a table of values for the threshold amount based on light conditions, etc. In other embodiments, the threshold amount 125 can be fixed or pre-configured based on the sensor and CFA being used.

The threshold amount 125, the range of values 115 and the sensor value 35a of the current pixel (e.g., Value$_1$ Pixel$_x$) are provided to comparison logic 130 to determine whether the current pixel is a defective pixel. Comparison logic 130 compares the sensor value 35a of the current pixel to the range of values 115 and if the sensor value 35a of the current pixel is greater than the maximum of the range of sensor values 115 or less than the minimum of the range of sensor values 115 by more than the threshold amount 125, the current pixel is determined to be a defective pixel.

For each defective pixel detected, replacement logic 140 calculates a replacement sensor value 35b (e.g., Value$_2$ Pixel$_x$) using the sensor values of the neighboring pixels and replaces the sensor value 35a of the defective pixel with the replacement value sensor 35b. For example, in one embodiment, the replacement sensor value 35b can be the median of the interpolated values 105 of the pixels immediately spatially adjacent to the current pixel. In another embodiment, the replacement sensor value 35b can be the median of all immediately spatially adjacent sensor values, including both actual sensor values 30 and interpolated sensor values 105. However, it should be understood that other replacement sensor values 35b can be used, such as a bilinear value or pixel replication value.

Figure 3:
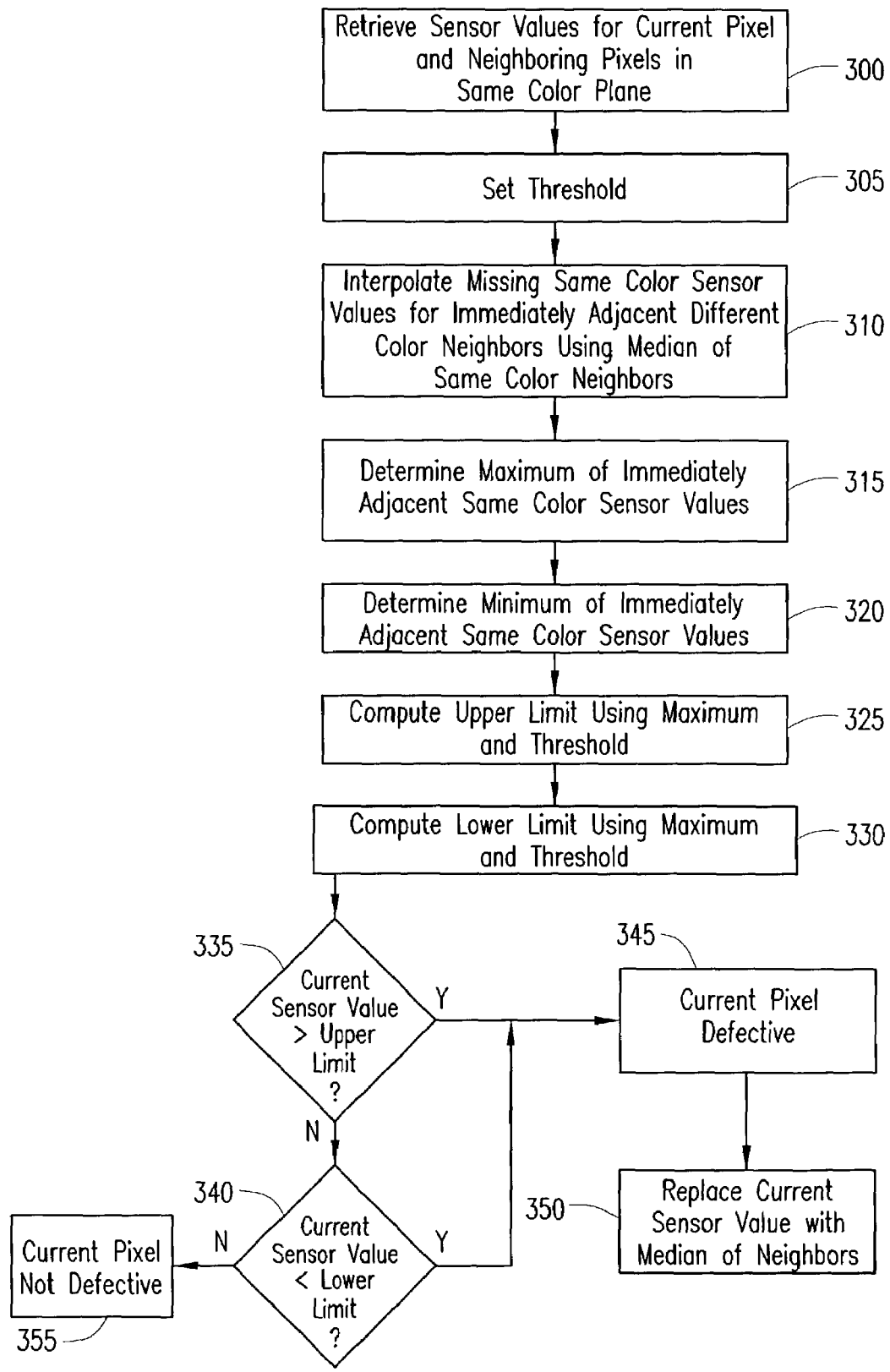
FIG. 3 is a flow chart illustrating exemplary steps for performing the BPC algorithm illustrated in FIG. 2.

Exemplary steps within the BPC algorithm are shown in FIG. 3. Initially, the sensor values at the current pixel location and neighboring pixel locations are measured and provided to the digital signal processor to determine whether the current pixel is a defective pixel. Upon retrieving the requisite number of neighboring sensor values from the buffer for analyzing the sensor value of the current pixel (step 300), a threshold amount can be set (step 305) to reduce the number of false bad pixel detections. For example, the threshold amount can be either pre-set based on the sensor, operator preference or CFA or variable depending on the light conditions of the image.

The sensor values in the same color plane as the current pixel are interpolated for immediately spatially adjacent pixels in different color planes using a median interpolation technique (step 310) to ensure that any defective sensor values remain isolated. From these interpolated values, and any immediately spatially adjacent raw (actual) sensor values in the same color plane, a maximum estimate (step 315) and a minimum estimate (step 320) for the sensor value of the current pixel are determined. The threshold amount is added to the maximum estimate to compute an upper limit (step 325) and subtracted from the lower estimate to compute a lower limit (step 330). If the sensor value of the current pixel being examined exceeds the upper limit (step 335) or falls below the lower limit (step 340), the current pixel is determined to be defective (step 345), and the sensor value of the current pixel is replaced with a replacement sensor value estimated from the immediately spatially adjacent neighboring pixels (step 350). However, if the sensor value is neither above the upper limit nor below the lower limit, the current pixel is not defective (step 355) and no changes are made to the sensor value of the current pixel.

Figure 4:
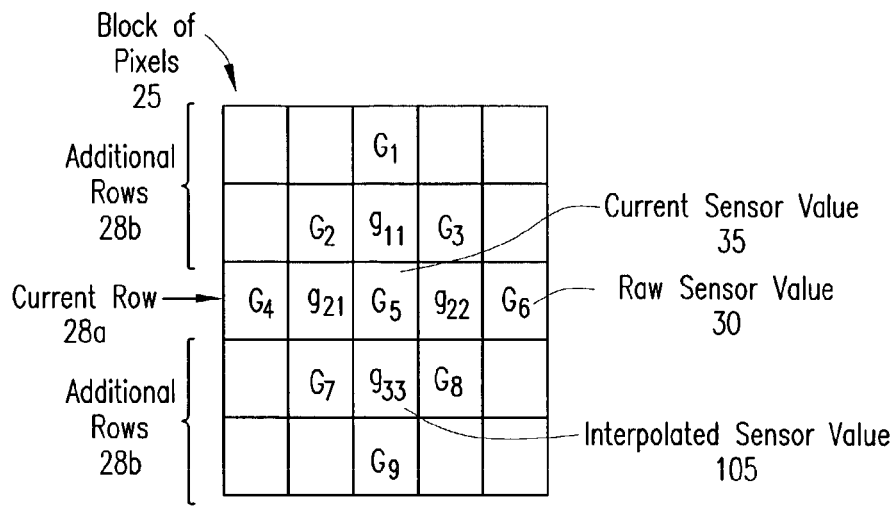
FIG. 4 is an exemplary 5×5 block of pixels illustrating sample raw green sensor values and interpolated green sensor values produced in accordance with embodiments of the BPC algorithm of the present invention.

Depending on the CFA used, green (luminance) pixels may be processed slightly differently than red or blue (chrominance) pixels. FIG. 4 shows an example of a 5×5 block of pixels 25 illustrating sample raw green sensor values and interpolated green sensor values produced in accordance with embodiments of the BPC algorithm of the present invention. The sensor value 35 of the current pixel under review is labeled $G_5$, the raw sensor values 30 obtained from pixels that are the same color as the current pixel are labeled "$G_n$", and the interpolated sensor values 105 obtained from neighboring raw sensor values are labeled "$g_n$". Sensor values are not shown for those pixels that are not used in the determination of whether the current pixel is defective.

In the example shown in FIG. 4, both the current row 28a of sensor values 30 that includes the current sensor value 35 and the two rows 28b above and below the current row 28a of sensor values 30 are stored in the buffer and processed to determine whether the current pixel "$G_5$" is a defective pixel. The sensor values 30 of the two rows 28b above and below are the minimum necessary to perform median interpolation for all of the different color pixels immediately spatially adjacent to the current pixel for a Bayer color filter mosaic pattern. However, more or fewer rows of sensor values can be used in the interpolation process. For example, only the single row above and single row below can be stored to interpolate only the horizontal immediately spatially adjacent sensor values. In addition, in other embodiments, only those sensor values necessary for interpolating immediately spatially adjacent values need be stored in the buffer or processed.

Figure 5:
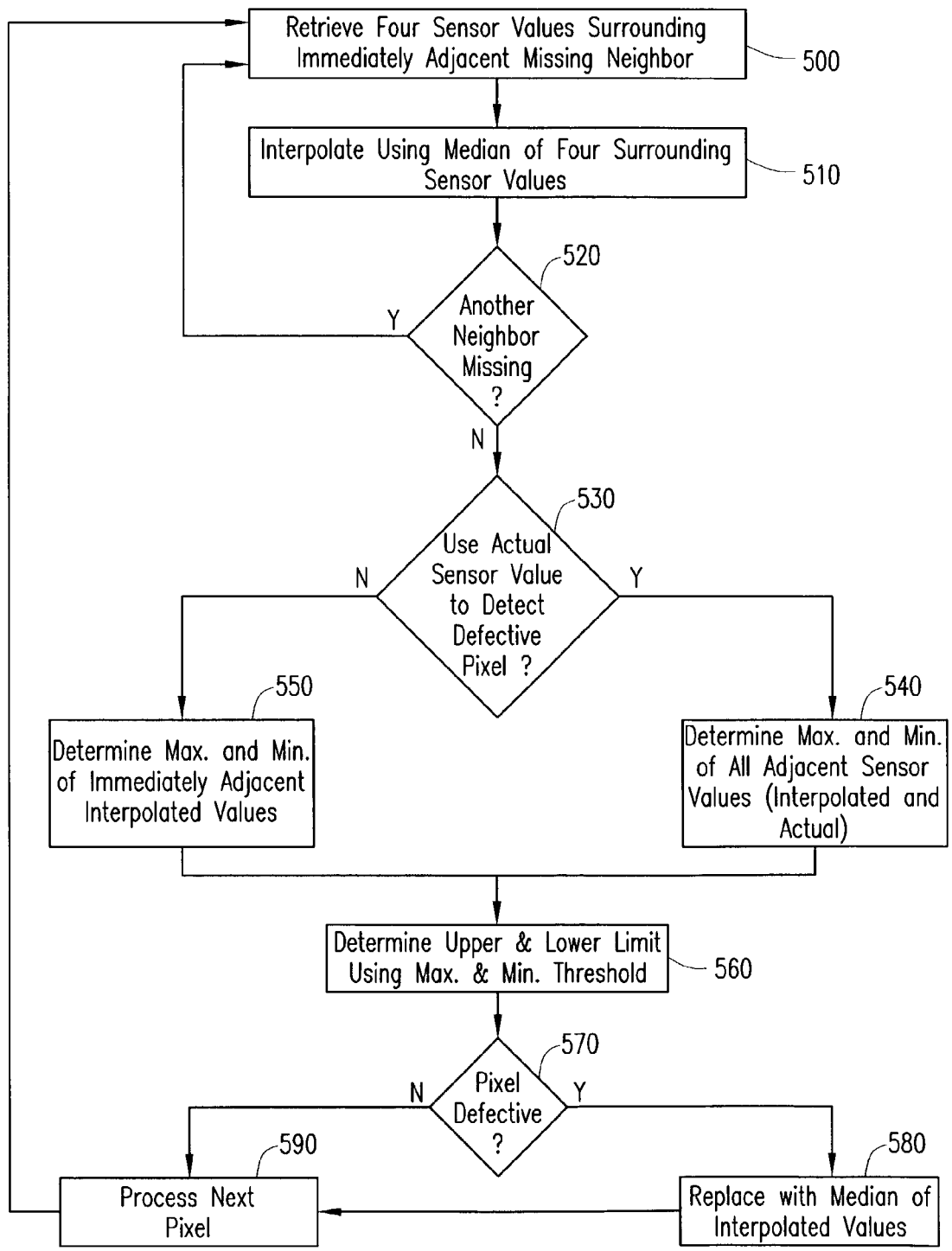
FIG. 5 is a flow chart illustrating exemplary steps for performing the BPC algorithm to interpolate green sensor values, as shown in FIG. 4, in accordance with embodiments of the present invention.

The 5×5 block of pixels 25 in FIG. 4 can be used to illustrate a sample implementation of the BPC algorithm to determine whether a green pixel is defective by interpolating green sensor values of immediately spatially adjacent different color pixel neighbors, as shown in the exemplary steps of FIG. 5. For green pixels, an examination of the Bayer pattern described above shows that the diagonal neighbors are also green, but that the horizontal and vertical neighbors are not green. Therefore, for a current green pixel, the green values for the horizontal and vertical neighbors can be estimated using a median interpolation technique to provide green values at all pixel locations immediately spatially adjacent to the current green pixel.

For each missing green value, the interpolation process begins by retrieving the sensor values of the four immediately spatially adjacent green pixel neighbors to the missing green value pixel location (step 500). From these four sensor values, an interpolated value is calculated using the median of four immediately spatially adjacent neighbors (step 510). For example, as shown in FIG. 4, the interpolated value $g_{11}$ for the upper vertical neighbor of current pixel $G_5$ is the median of the sensor values of the four immediate green pixel neighbors. $G_1$, $G_2$, $G_3$ and $G_5$. Similarly, the interpolated value $g_{21}$ for the left horizontal neighbor is the median of the sensor values of the four immediate green pixel neighbors $G_2$, $G_4$, $G_5$ and $G_7$. Interpolated values $g_{31}$ and $g_{22}$ can be calculated in a similar manner. As an example, if the values of $G_3$, $G_5$, $G_6$ and $G_8$ are 11, 13, 45, 15, respectively, the interpolated value $g_{22}$ is: (13+15)/2=14.

By using the median of the four immediately spatially adjacent green neighbors to the missing green pixel as the interpolated value, if one of the four green neighbors is a defective pixel, the defective value will not be "smeared" into any of the interpolated values. This can be easily seen by the example above. Of the sensor values listed for $G_3$, $G_5$, $G_6$ and $G_8$ above, the sensor value of $G_6$ (45) is potentially indicative of a defective pixel due to the large difference compared to surrounding values. Since median interpolation removes the high and low values, the value of $G_6$ is filtered and not used for computing the interpolated value. Hence, median interpolation isolates defective pixel values to ensure that defective pixel values do not skew the interpolated values.

This process is repeated until all missing green values are interpolated for the immediately spatially adjacent pixels to the current green pixel (step 520). Once the interpolation is performed, the pattern of green pixels becomes as shown in FIG. 4 (with interpolated values shown in lowercase). Now, the current green sensor value ($G_5$ in FIG. 4) can be compared with the immediate spatially adjacent neighbors to determine if the current green sensor value is defective. For normal pixels, the smoothness imposed by optics and the continuity of objects implies that the sensor value of a pixel should not exceed the sensor values of all the immediate neighbors by more than a threshold amount, and similarly, the sensor value of the pixel should not fall below the sensor values of all the immediate neighbors by more than the threshold amount.

To test the pixel, the maximum sensor value and minimum sensor value of the immediately spatially adjacent neighbors are used as the basis for determining whether the current pixel is defective. With a Bayer CFA, green pixels have immediately spatially adjacent diagonal green neighbors. Therefore, when determining the maximum and minimum sensor values, either all of the immediately spatially adjacent values (including the raw sensor values from adjacent green pixels) can be used (steps 530 and 540), or only the interpolated immediately spatially adjacent values can be used (steps 530 and 550). Since the interpolated values are not skewed by defective pixels (as discussed above), using only the interpolated values can provide a more accurate estimate of the maximum and minimum values. From the maximum and minimum values, the upper and lower limits can be calculated using the configurable threshold amount (T) (step 560). As an example, a value of T=7 for 8-bit systems is suitable for most images. However, it should be understood that the value of T can be adjusted depending on the noise level of the image.

Using the example in FIG. 4, the current pixel $G_5$ is considered defective if either:

$$G_5 > \max(G_2, g_1, G_3, g_{21}, g_{22}, G_7, g_{31}, G_8) + T$$

or $$G_5 < \min(G_2, g_{11}, G_3, g_{21}, g_{22}, G_7, g_{31}, G_8) - T.$$

Alternatively, the current pixel $G_5$ is considered defective if either:

$$G_5 > \max(g_{11}, g_{21}, g_{22}, g_{31}) + T$$

or $$G_5 < \min(g_{11}, g_{21}, g_{22}, g_{31}) - T.$$

If $G_5$ is defective by either test (step 570), the sensor value of $G_5$ is replaced using a replacement sensor value estimated from the sensor values of neighboring pixels (step 580). For example, the sensor value can be replaced by the median of the four interpolated values $\{g_{11}, g_{21}, g_{22}, g_{31}\}$. It should be noted that alternative replacement sensor values are possible, such as a bilinear value or a pixel replication value. The entire process is repeated for each green pixel in the image (step 590).

In other embodiments, a variation on the rank order statistic can be used as the test for whether a pixel is defective. For example, instead of using the maximum and minimum values, a median or mean value could be used. As an example, if the median were used, the pixel $G_5$ would be considered defective if either:

$$G_5 > \text{median}(G_2, g_{11}, G_3, g_{21}, g_{22}, G_7, g_{31}, G_8) + T$$

or $$G_5 < \text{median}(G_2, g_{11}, G_3, g_{21}, g_{22}, G_7, g_{31}, G_8) - T.$$

Alternatively, the current pixel $G_5$ would be considered defective if either:

$$G_5 > \text{median}(g_{11}, g_{21}, g_{22}, g_{31}) + T$$

or $$G_5 < \text{median}(g_{11}, g_{21}, g_{22}, g_{31}) - T$$

It should be understood that when using the median (or mean), the threshold value (T) would normally be larger than when using the maximum or minimum values.

Figure 6A:
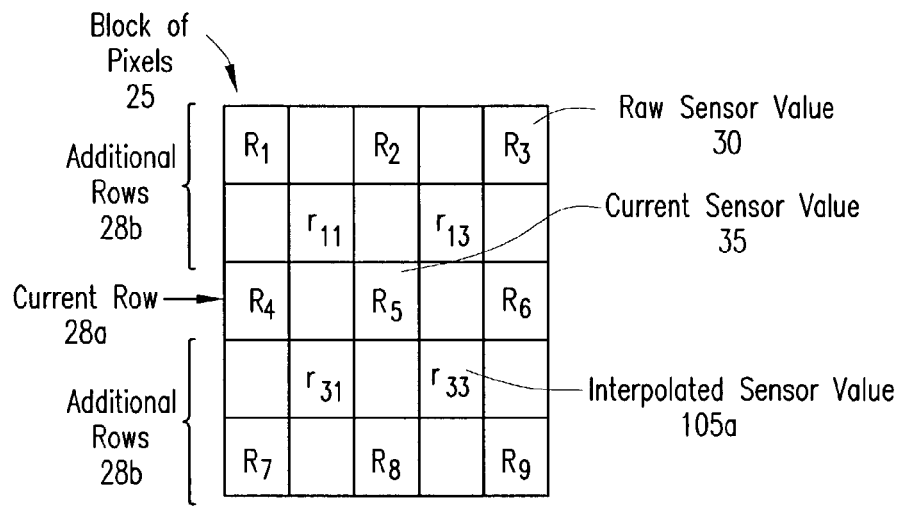
FIGS. 6A and 6B illustrate an exemplary 5×5 block of pixels showing raw red sensor values and interpolated red sensor values produced in accordance embodiments of the BPC algorithm of the present invention.
Figure 6B:
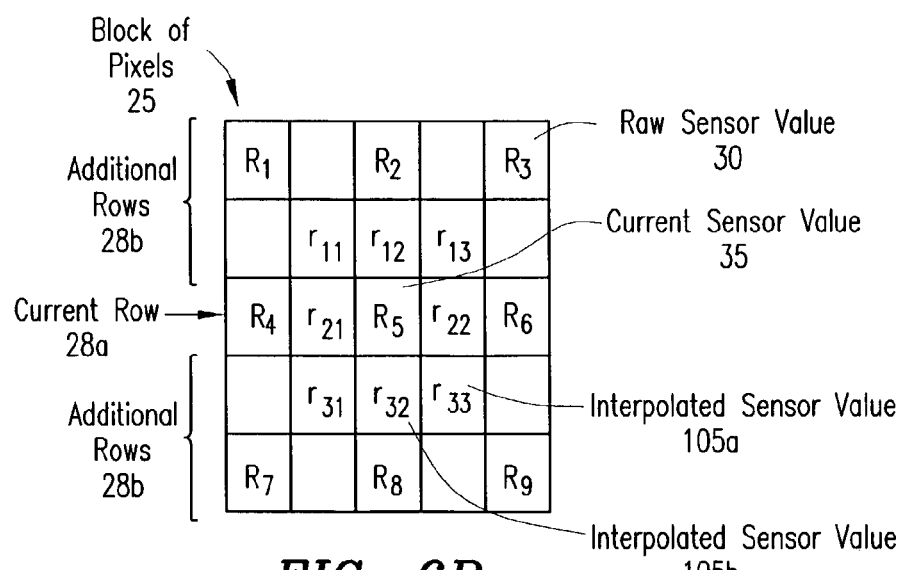

Turning now to FIGS. 6A and 6B, an example of a 5×5 block of pixels 25 illustrating sample raw red sensor values 30 and interpolated red sensor values 105 in accordance with embodiments of the BPC algorithm of the present invention is shown. The sensor value 35 of the current pixel under review is labeled $R_5$, the raw sensor values 30 obtained from pixels that are the same color as the current pixel are labeled "$R_n$", and the interpolated sensor values 105 obtained from neighboring raw sensor values are labeled "$r_n$". Sensor values are not shown for those pixels that are not used in the determination of whether the current pixel is defective.

In the example shown in FIGS. 6A and 6B, both the current row 28a of sensor values 30 that includes the current sensor value 35 and the two rows 28b above and below the current row 28a of sensor values 30 are stored in the buffer and processed to determine whether the current pixel "$R_5$" is a defective pixel. The sensor values 30 of the two rows 28b above and below are the minimum necessary to perform median interpolation for the different color pixels immediately spatially adjacent to the current pixel for a Bayer color filter mosaic pattern. However, more or fewer rows of sensor values can be used in the interpolation process. For example, only the single row above and single row below can be stored to interpolate only the horizontal immediately spatially adjacent sensor values. In addition, in other embodiments, only those sensor values necessary for interpolating immediately spatially adjacent values need be stored in the buffer or processed.

Figure 7:
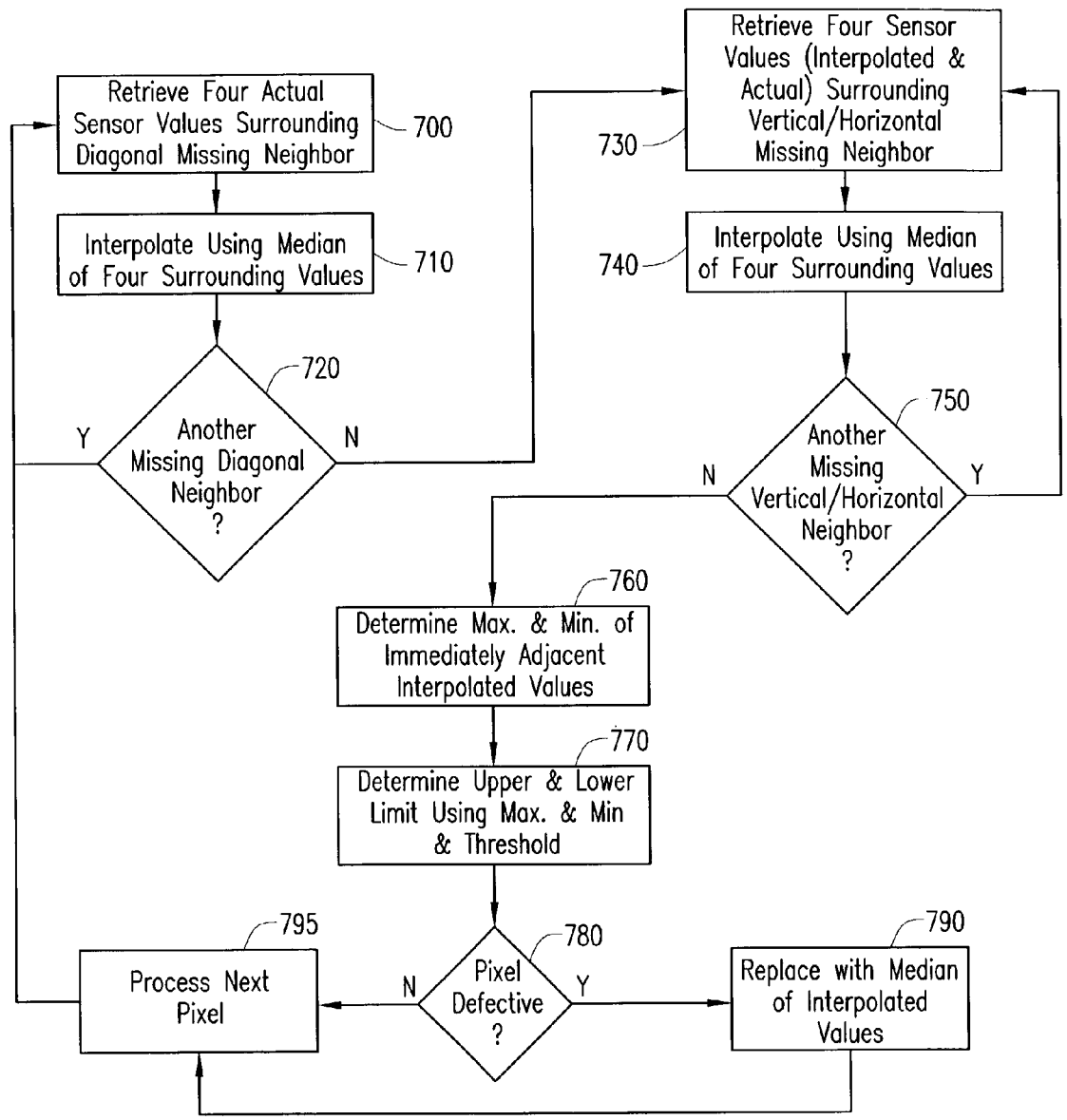
FIG. 7 is a flow chart illustrating exemplary steps for performing the BPC algorithm to interpolate red sensor values, as shown in FIG. 6, in accordance with embodiments of the present invention.

The 5×5 block of pixels 25 in FIGS. 6A and 6B can be used to illustrate a sample implementation of the BPC algorithm to determine whether a red pixel is defective by interpolating red sensor values of immediately spatially adjacent different color pixel neighbors, as shown in the exemplary steps of FIG. 7. It should be understood that, although not shown, a similar process is used for blue pixels. Unlike green pixels, in the Bayer pattern, there are no immediately spatially adjacent red neighbors to a red pixel. Therefore, for a current red pixel, the red values for the horizontal, vertical and diagonal immediately spatially adjacent neighbors must be estimated using a median interpolation technique to provide red values at all pixel locations immediately spatially adjacent to the current red pixel.

Median interpolation for chrominance (red and blue) pixels has two steps. First, missing values having four diagonal immediately spatially adjacent neighbors are interpolated using the median of the four diagonal neighbors. Second, the remaining missing pixels are interpolated using the median of north, south, east, and west immediately spatially adjacent neighbors. Therefore, initially, the missing red values for the diagonal immediately spatially adjacent neighbors to the current red pixel are calculated since each of the diagonally immediately spatially adjacent neighbors to the current red pixel has four red diagonal immediately spatially adjacent neighbors. For each missing diagonal red value, the interpolation process begins by retrieving the sensor values of the four diagonal red pixel neighbors to the missing diagonal red value (step 700). From these four sensor values, an interpolated value is calculated using the median of four immediate neighbors (step 710).

For example, as shown in FIG. 6A, the interpolated value $r_{11}$ for the upper-left diagonal neighbor of current pixel $R_5$ is the median of the sensor values of the four diagonal red pixel neighbors: $R_1$, $R_2$, $R_4$ and $R_5$. Similarly, the interpolated value $r_{13}$ for the upper-right diagonal neighbor is the median of the sensor values of the four diagonal red pixel neighbors $R_2$, $R_3$, $R_5$ and $R_6$. Interpolated values $r_{31}$ and $r_{33}$ can be calculated in a similar manner. This process is repeated until all missing diagonal red values $r_{11}$, $r_{13}$, $r_{31}$ and $r_{33}$ are interpolated (step 720).

Thereafter, the missing red values for the horizontal and vertical (north, south, east and west) immediately spatially adjacent neighbors to the current red pixel are calculated using the red sensor values of the surrounding red pixel neighbors and the diagonal red interpolated values. For each missing horizontal or vertical red value, the interpolation process begins by retrieving the raw sensor values and interpolated sensor values of the four neighboring pixel locations to the missing red value pixel location (step 730). From these four sensor values, an interpolated value is calculated using the median of four immediately spatially adjacent neighbors (step 740).

For example, as shown in FIG. 6B, the interpolated value $r_{12}$ for the upper vertical neighbor of current pixel $R_5$ is the median of the sensor values of the four pixel neighbors: $R_2$, $r_{11}$, $R_5$ and $r_{13}$. Similarly, the interpolated value $r_{22}$ for the right horizontal neighbor is the median of the sensor values of the four pixel neighbors $R_6$, $r_{33}$, $R_5$ and $r_{13}$. Interpolated values $r_{21}$ and $r_{32}$ can be calculated in a similar manner. This process is repeated until all missing horizontal ($r_{21}$ and $r_{22}$) and vertical ($r_{12}$ and $r_{32}$) red values are interpolated (step 750).

Once the interpolation is performed, the pattern of red pixels becomes as shown in FIG. 6B (with interpolated values shown in lowercase). Thereafter, the maximum sensor value and minimum sensor value of the immediately spatially adjacent interpolated red values are used as the basis for determining whether the current pixel is defective (step 760). From the maximum and minimum values, the upper and lower limits can be calculated using the configurable threshold amount (T) (step 770). The threshold amount T used for the red color plane and blue color plane can be the same as that used for the green color plane, although variation in threshold amounts with color can occur.

Using the example in FIG. 6B, the current pixel $R_5$ is considered defective if either:

$$R_5 > \max(r_{11}, r_{12}, r_{13}, r_{21}, r_{22}, r_{31}, r_{32}, r_{33}) + T$$

or $$R_5 < \min(r_{11}, r_{12}, r_{13}, r_{21}, r_{22}, r_{31}, r_{32}, r_{33}) - T.$$

If $R_5$ is defective by either test (step 780), the sensor value of $R_5$ is replaced using a replacement sensor value estimated from the sensor values of neighboring pixels (step 790). For example, the sensor value can be replaced by the median of all the interpolated values $\{r_{11}, r_{12}, r_{13}, r_{21}, r_{22}, r_{31}, r_{32}, r_{33}\}$. It should be noted that alternative replacement sensor values are possible, such as a bilinear value or a pixel replication value. The entire process is repeated for each red pixel in the image (step 795).

Figure 8:
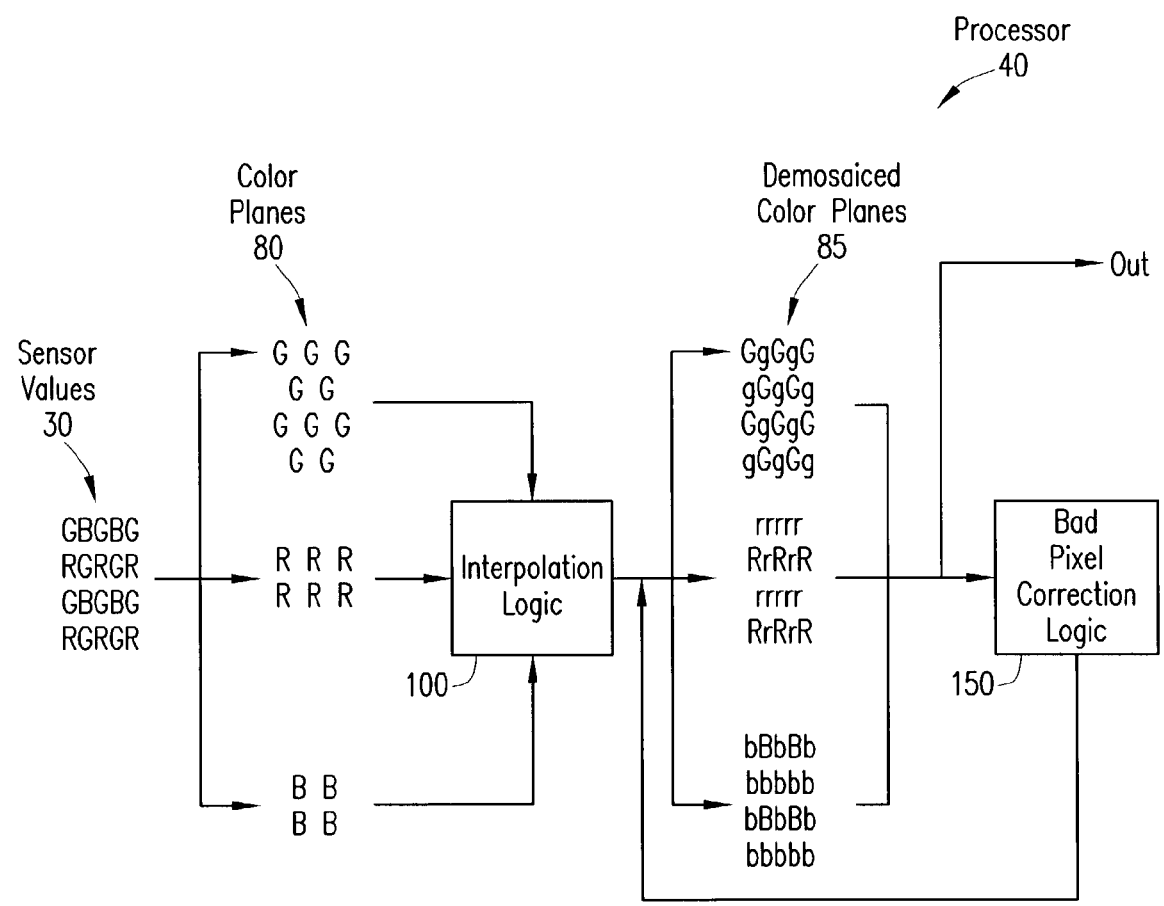
FIG. 8 is a is a logic flow diagram illustrating exemplary logic for implementing the BPC and demosaicing algorithm in accordance with embodiments of the present invention.

In further embodiments, the interpolated values computed during the bad pixel correction process can be re-used during demosaicing, as shown in FIG. 8. When the raw sensor values 30 arrive at the digital signal processor 40, the raw sensor values 25 are separated into three raw color planes 80, each having missing elements. The digital signal processor 40 applies interpolation logic 100 to the raw color planes 80 in order to determine the missing values at each location. For example, interpolation logic 100 interpolates the green value at each red or blue pixel location, the red value at each green or blue pixel location and the blue value at each green or red pixel location, using median interpolation, as discussed above in connection with FIGS. 4–7. All missing sensor values are interpolated to provide all of the immediately spatially adjacent sensor values to each pixel. The resulting demosaiced color planes 85 contain both the original values, which are represented by upper case letters (G, R and B), and the interpolated values, which are represented by the lower case letters (g, r and b).

The demosaiced color planes 85 are used by bad pixel correction logic 150 to both determine a range of values for each pixel using the interpolated immediately spatially adjacent sensor values and compare each sensor value with its associated range of values to determine if the pixel is defective. Any defective pixels are replaced using replacement sensor values estimated from neighboring pixels The corrected demosaiced color planes 85 are output as the demosaiced color image, without any further processing. Therefore, both BPC and demosaicing are performed in a single stage.

Figure 9:
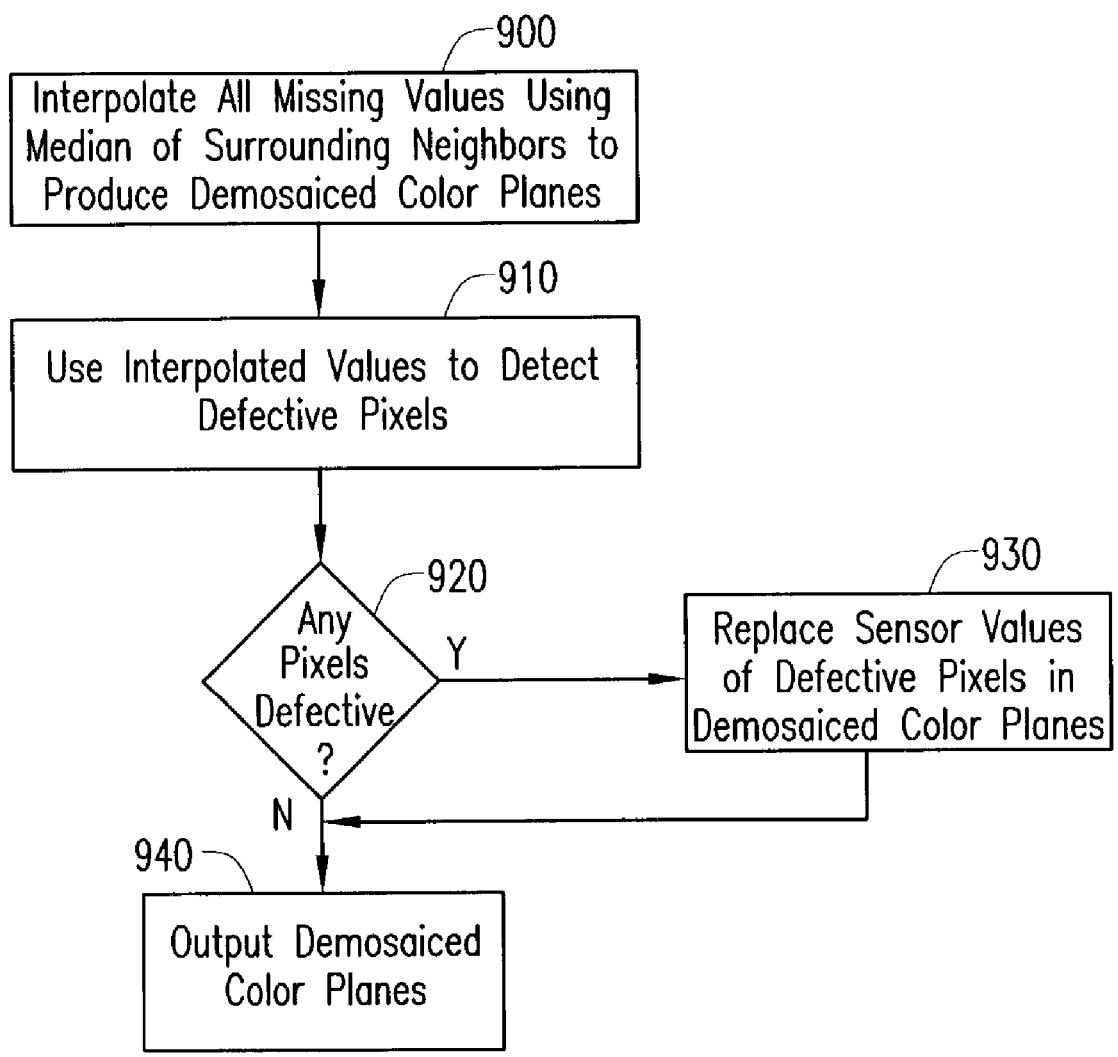
FIG. 9 is a flow chart illustrating the exemplary steps for performing the BPC and demosaicing algorithm shown in FIG. 8.

FIG. 9 illustrates exemplary steps for performing bad pixel correction and demosaicing in a single stage. Initially, the processor receives the raw sensor values and interpolates all of the missing sensor values (as described above in connection with FIGS. 4–7) (step 900). The interpolated color planes are used to detect defective pixels (step 910), and if any defective pixels are detected (step 920), the sensor values of the defective pixels are replaced using replacement sensor values estimated from neighboring pixels (step 930). The corrected interpolated color planes are output as the demosaiced image (step 940) for use in later processing, such as compression or conversion for display on a display device.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

I claim:

1. A digital image system for correcting sensor values generated by pixels within an array of pixels, each of said pixels within said array of pixels producing a respective one of said sensor values for an image, said digital image system comprising:
   a buffer for storing at least a portion of said sensor values produced by said pixels for said image, one of said stored sensor values being a current sensor value in a first color plane produced by a current one of said pixels; and
   a processor connected to receive said sensor values stored in said buffer, compute interpolated sensor values in said first color plane for said pixels spatially adjacent to said current pixel using said stored sensor values and determine whether said current pixel is defective using said interpolated sensor values.

2. The digital image system of claim 1, wherein said processor is further configured to determine a threshold amount and calculate a range of sensor values for said current pixel using at least said interpolated values, said current pixel being defective when said current sensor value is outside of said range of sensor values by more than said threshold amount.

3. The digital image system of claim 2, wherein said range of sensor values includes a maximum value and a minimum value from at least said interpolated sensor values, said current pixel being defective when said current sensor value either exceeds said maximum value by more than said threshold amount or falls below said minimum value by more than said threshold amount.

4. The digital image system of claim 3, wherein said maximum value and said minimum value are determined from both said interpolated values and said sensor values in the first color plane produced from said pixels immediately spatially adjacent to said current pixel.

5. The digital image system of claim 2, wherein said range of sensor values includes a rank order statistic value produced from at least said interpolated sensor values, said current pixel being defective when said current sensor value either exceeds said rank order statistic value by more than said threshold amount or falls below said rank order statistic value by more than said threshold amount.

6. The digital image system of claim 2, wherein said processor is further configured to replace said current sensor value with a replacement sensor value calculated using said interpolated sensor values when said current pixel is defective.

7. The digital image system of claim 6, wherein said replacement sensor value is a median value of said interpolated sensor values.

8. The digital image system of claim 6, wherein said processor is further configured to demosaic said sensor values using said interpolated sensor values and said replacement sensor value.

9. The digital image system of claim 2, wherein said threshold amount is pre-configured.

10. The digital image system of claim 2, wherein said threshold amount is variable based on said sensor values.

11. The digital image system of claim 1, wherein said processor is further configured to compute said interpolated sensor values using a median interpolation technique.

12. The digital image system of claim 11, wherein said processor is further configured to compute each of said interpolated sensor values using the median of four of said sensor values in said first color plane associated with surrounding ones of said pixels to said immediately spatially adjacent pixels of said current pixel.

13. The digital image system of claim 12, wherein said four sensor values include two of said interpolated sensor values for two of said surrounding pixels and two of said sensor values produced by two of said surrounding pixels.

14. A method for correcting sensor values generated by pixels within an array of pixels, each of said pixels within said array of pixels producing a respective one of said sensor values for an image, said method comprising:
  receiving at least a portion of said sensor values produced by said pixels for said image, one of said received sensor values being a current sensor value in a first color plane produced by a current one of said pixels;
  computing interpolated sensor values in said first color plane for said pixels spatially adjacent to said current pixel using said received sensor values; and
  determining whether said current pixel is defective using said interpolated sensor values.

15. The method of claim 14, wherein said step of determining further comprises:
  determining a threshold amount,
  calculating a range of sensor values for said current pixel using at least said interpolated sensor values; and
  determining that said current pixel is defective when said current sensor value is outside of said range of sensor values by more than said threshold amount.

16. The method of claim 15, wherein said range of sensor values includes a maximum value and a minimum value from at least said interpolated sensor values, and said step of determining that said current pixel is defective further comprises:
  determining that said current pixel is defective when said current sensor value either exceeds said maximum value by more than said threshold amount or falls below said minimum value by more than said threshold amount.

17. The method of claim 16, wherein said step of calculating said range of sensor values further comprises:
  calculating said maximum value and said minimum value from both said interpolated sensor values and said sensor values in the first color plane produced from said pixels immediately spatially adjacent to said current pixel.

18. The method of claim 15, wherein said range of sensor values includes a rank order statistic value produced from at least said interpolated sensor values, and said step of determining that said current pixel is defective further comprises:
  determining that said current pixel is defective when said current sensor value either exceeds said rank order statistic value by more than said threshold amount or falls below said rank order statistic value by more than said threshold amount.

19. The method of claim 15, further comprising:
  replacing said current sensor value with a replacement sensor value calculated using said interpolated sensor values when said current pixel is defective.

20. The method of claim 19, wherein said replacement sensor value is a median value of said interpolated sensor values.

21. The method of claim 19, further comprising:
  demosaicing said sensor values using said interpolated sensor values and said replacement sensor value.

22. The method of claim 15, wherein said determining said threshold amount further comprises:
  pre-configuring said threshold amount.

23. The method of claim 15, wherein said determining said threshold amount further comprises:
  configuring said threshold amount based on said sensor values.

24. The method of claim 14, wherein said computing further comprises:
  computing said interpolated sensor values using a median interpolation technique.

25. The method of claim 24, wherein said computing further comprises:
  computing each of said interpolated sensor values using the median of four of said sensor values in said first color plane associated with surrounding ones of said pixels to said immediately spatially adjacent pixels of said current pixel.

26. The method of claim 25, wherein said four sensor values include two of said interpolated values for two of said surrounding pixels and two of said sensor values produced by two of said surrounding pixels.

* * * * *